United States Patent
Polito

(10) Patent No.: US 6,374,542 B1
(45) Date of Patent: Apr. 23, 2002

(54) TREE MOUNTABLE PLANTER ASSEMBLY

(76) Inventor: Amy L. Polito, S. 1511 Beaver Creek Rd., Wisconsin Dells, WI (US) 53965

( * ) Notice: Subject to any disclaimer, the term of this patent is extended or adjusted under 35 U.S.C. 154(b) by 0 days.

(21) Appl. No.: 09/641,848

(22) Filed: Aug. 18, 2000

(51) Int. Cl.[7] .............................................. A01G 25/00
(52) U.S. Cl. ............................ 47/79; 47/65.8; 47/66.6; 47/41.1
(58) Field of Search .......................... 47/79, 65.8, 66.6, 47/41.01, 41.1, 41.12

(56) References Cited

U.S. PATENT DOCUMENTS

| | | | |
|---|---|---|---|
| 388,154 A | 8/1888 | Stanley et al. ................. 47/76 |
| 1,959,139 A | 5/1934 | Otwell ........................ 111/99 |
| 2,022,607 A | 11/1935 | Sorensen ..................... 206/423 |
| 5,050,343 A | * 9/1991 | Henttonen ..................... 47/79 |
| 5,155,934 A | * 10/1992 | Leider ............................ 47/79 |
| 5,259,141 A | 11/1993 | D'alessandro ............. 248/27.8 |
| 5,311,700 A | 5/1994 | Thomas ......................... 47/76 |
| 5,454,191 A | 10/1995 | Mayeda et al. .............. 47/65.8 |
| 5,622,004 A | * 4/1997 | Gidge ............................ 47/71 |

* cited by examiner

Primary Examiner—Charles T. Jordan
Assistant Examiner—Stephen Holzen

(57) ABSTRACT

A tree mountable planter assembly for planting flowers in non-conventional locations. The tree mountable planter assembly includes a main member adapted for being supported by a tree and having an interior space and a main opening, an amount of soil located within the interior space of the main member, a watering assembly coupled to the main opening, and a hole adapted for allowing the stalk of a plant to extend through the hole while the roots are planted in the soil located in the interior of the main member.

12 Claims, 3 Drawing Sheets

TREE MOUNTABLE PLANTER ASSEMBLY

BACKGROUND OF THE INVENTION

1. Field of the Invention

The present invention relates to planters and more particularly pertains to a new tree mountable planter assembly for planting flowers in non-conventional locations.

2. Description of the Prior Art

The use of planters is known in the prior art. More specifically, planters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,259,141; 5,454,191; 5,311,700; 2,022,607; 388,154; and 1,959,139.

While these devices fulfill their respective, particular objectives and requirements, the aforementioned patents do not disclose a new tree mountable planter assembly. The inventive device includes a main member adapted for being supported by a tree and having an interior space and a main opening, an amount of soil located within the interior space of the main member, a watering assembly coupled to the main opening, and a hole adapted for allowing the stalk of a plant to extend through the hole while the roots are planted in the soil located in the interior of the main member.

In these respects, the tree mountable planter assembly according to the present invention substantially departs from the conventional concepts and designs of the prior art, and in so doing provides an apparatus primarily developed for the purpose of planting flowers in non-conventional locations.

SUMMARY OF THE INVENTION

In view of the foregoing disadvantages inherent in the known types of planters now present in the prior art, the present invention provides a new tree mountable planter assembly construction wherein the same can be utilized for planting flowers in non-conventional locations.

The general purpose of the present invention, which will be described subsequently in greater detail, is to provide a new tree mountable planter assembly apparatus and method which has many of the advantages of the planters mentioned heretofore and many novel features that result in a new tree mountable planter assembly which is not anticipated, rendered obvious, suggested, or even implied by any of the prior art planters, either alone or in any combination thereof.

To attain this, the present invention generally comprises a main member adapted for being supported by a tree and having an interior space and a main opening, an amount of soil located within the interior space of the main member, a watering assembly coupled to the main opening, and a hole adapted for allowing the stalk of a plant to extend through the hole while the roots are planted in the soil located in the interior of the main member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tree mountable planter assembly apparatus and method which has many of the advantages of the planters mentioned heretofore and many novel features that result in a new tree mountable planter assembly which is not anticipated, rendered obvious, suggested, or even implied by any of the prior art planters, either alone or in any combination thereof.

It is another object of the present invention to provide a new tree mountable planter assembly which may be easily and efficiently manufactured and marketed.

It is a further object of the present invention to provide a new tree mountable planter assembly which is of a durable and reliable construction.

An even further object of the present invention is to provide a new tree mountable planter assembly which is susceptible of a low cost of manufacture with regard to both materials and labor, and which accordingly is then susceptible of low prices of sale to the consuming public, thereby making such tree mountable planter assembly economically available to the buying public.

Still yet another object of the present invention is to provide a new tree mountable planter assembly which provides in the apparatuses and methods of the prior art some of the advantages thereof, while simultaneously overcoming some of the disadvantages normally associated therewith.

Still another object of the present invention is to provide a new tree mountable planter assembly for planting flowers in non-conventional locations.

Yet another object of the present invention is to provide a new tree mountable planter assembly which includes a main member adapted for being supported by a tree and having an interior space and a main opening, an amount of soil located within the interior space of the main member, a watering assembly coupled to the main opening, and a hole adapted for allowing the stalk of a plant to extend through the hole while the roots are planted in the soil located in the interior of the main member.

Still yet another object of the present invention is to provide a new tree mountable planter assembly that be positioned along the edge of water ponds, in trees, over fences, and on top of rocks.

Even still another object of the present invention is to provide a new tree mountable planter assembly that eliminates the need to weed flower arrangements.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
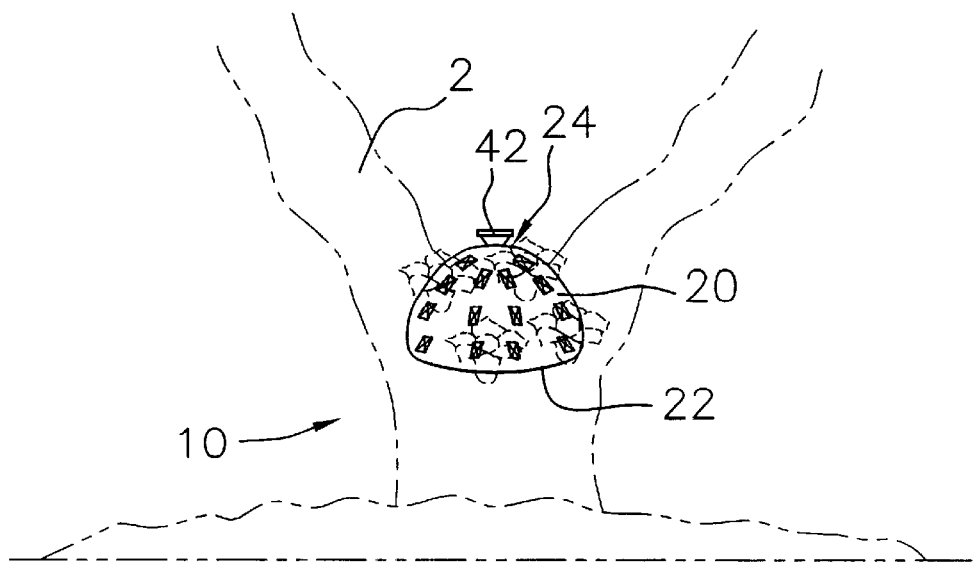
FIG. 1 is a schematic side view of a new tree mountable planter assembly according to the present invention.
Figure 2:
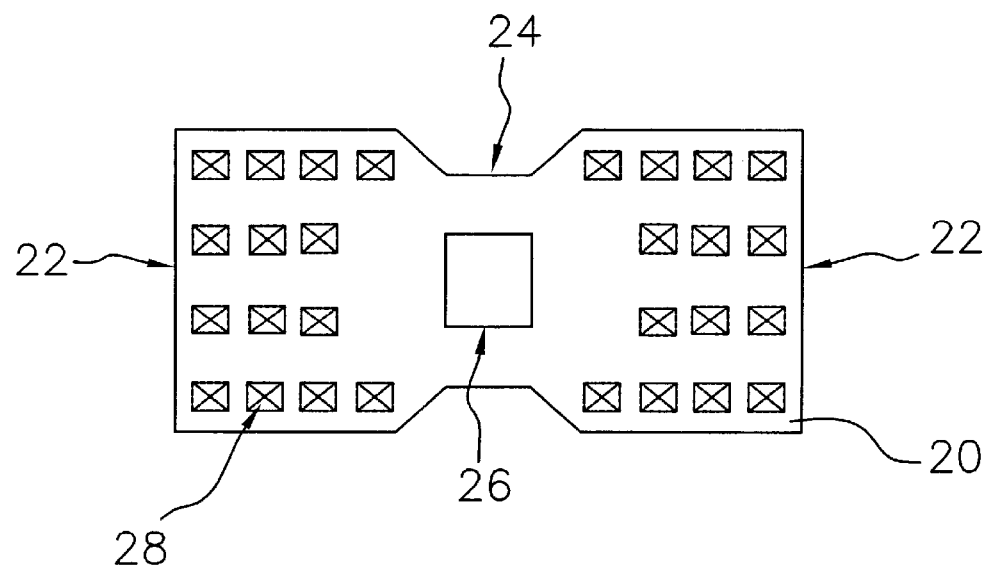
FIG. 2 is a schematic top view of the present invention.
Figure 3:
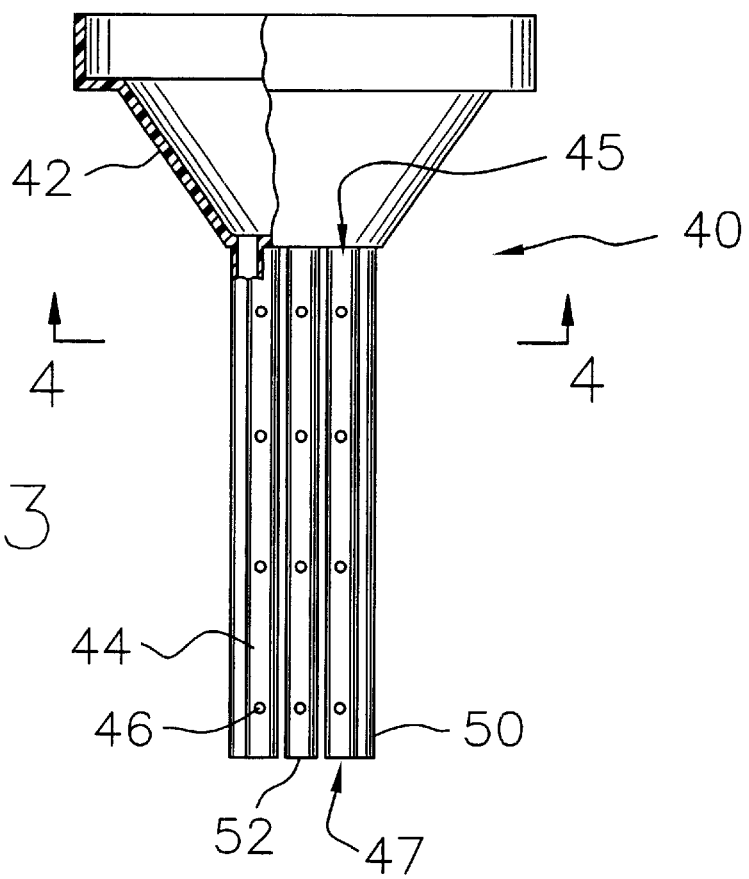
FIG. 3 is a schematic detail view of the funnel portion and distribution ducts of the present invention.
Figure 4:
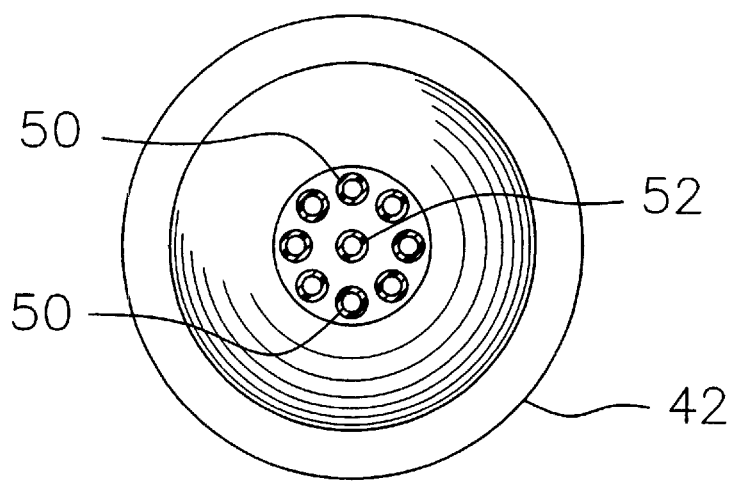
FIG. 4 is a schematic cross-sectional view of the present invention taken along line 4—4 of FIG. 3.
Figure 5:
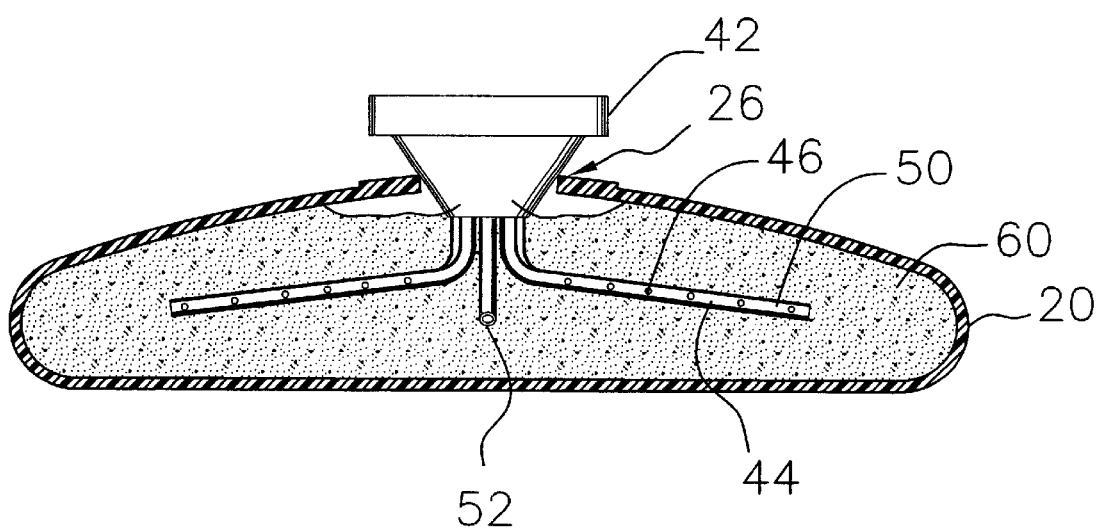
FIG. 5 is a schematic cross-sectional view of the present invention.

With reference now to the drawings, and in particular to FIGS. 1 through 5 thereof, a new tree mountable planter assembly embodying the principles and concepts of the present invention and generally designated by the reference numeral 10 will be described.

As best illustrated in FIGS. 1 through 5, the tree mountable planter assembly 10 generally comprises an elongate flexible main member 20, an amount of soil 60, and a watering assembly 40.

The elongate flexible main member 20 is designed for being supported by a tree 2 at a junction between a plurality of divergent branches of the tree 2. The main member 20 includes opposite ends 22 which can be draped over the junction of multiple branches, such that a central portion 24 of the main member 20 is supported by the junction of the tree 2. The main member 20 includes an interior space and a main opening 26.

The main member 20 is formed by a membranous pouch for permitting atmospheric communication between the interior space and ambient air surrounding the main member 20.

The main opening 26 is positioned in an upwardly facing surface of the central portion 24 of the main member 20. The soil 60 is held in the interior space of the main member 20.

the watering assembley 40 is coupled to the main opening 26. The watering assembly 40 includes a funnel portion 42 for receiving water for adding moisture to the soil 60 in the interior space.

The watering assembly 40 includes a plurality of flexible distribution ducts 44. Each of the distribution ducts 44 includes an open first end 45 and a second end 47. The open first end 45 is in environmental communication with the funnel portion 42. Thus a fluid passing through the funnel portion 42 passes into the distribution ducts 44.

In an embodiment the second end 47 of each of the distribution ducts 44 is closed.

Each of the distribution ducts 44 includes a plurality of dispensing holes 46 positioned in spaced relationship along a length of the distribution duct 44 for permitting fluid passing through the distribution duct 44 to pass into the soil 60.

In an embodiment the second end 47 of each of the distribution ducts 44 has a small aperture such that a fluid can pass through the second end 47. However, the aperture is sufficiently small that sufficient back-pressure is created to allow the fluid to flow through the dispensing holes 46 along the length of the distribution ducts 44.

The plurality of distribution ducts 44 includes a plurality of outer distribution ducts 50. Each of the outer distribution ducts 50 is positioned to extend outward from the central portion 24 of the main member 20 towards a peripheral edge of the main member 20.

The plurality of distribution ducts 44 includes a central duct 52 which extends downward from the funnel portion 42 of the watering assembly 40.

The main member 20 includes a plurality of cutout panels 28 positioned in a spaced relationship to each other. Each of the cutout panels 28 is positioned on the upward facing surface of the main member 20. Each of the cutout panels 28 is selectively removable from the main member 20 for forming an associated cutout hole. Each of the cutout holes is designed for permitting a stalk of a plant to pass through the cutout hole while roots of the plant are embedded in the soil 60 for permitting the plant to grow in the soil 60.

In use, the user removes the desired cut-out panels. The user then places the root portion of a plant, or a seed for a plant in the soil beneath each of the cutout holes created by removing the cutout panels. The user then places the tree mountable planter assembly in a desired location. Illustrative examples of desired locations include, but are not limited to the junction of branches in a tree, over a fence, and on the top of a rock. The user then waters the plants using the funnel portion of the watering assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tree mountable planter assembly comprising:
   a main member adapted for being supported by a tree, said main member having an interior space and a main opening;

an amount of soil, said soil being held in said interior space of said main member;

a watering assembly coupled to said main opening, said watering assembly including a funnel portion for receiving water for adding moisture to said soil in said interior space;

said main member having a hole, said hole being adapted for permitting a stalk of a plant to pass through said hole while roots of the plant are embedded in said soil for permitting the plant to grow in said soil; and said watering assembly including a plurality of flexible distribution ducts, each of said distribution ducts having an open first end and a closed second end, said open first end being in environmental communication with said funnel portion whereby a fluid passing through said funnel portion passes into said distribution ducts.

2. The tree mountable planter assembly of claim 1, further comprising:

said main member being elongate and flexible; said elongate flexible main member adapted for being supported by a tree at a junction between a plurality of divergent branches of the tree, said main member having opposite ends drapable over the junction such that a central portion of said main member is supported by the junction of the tree, said main member having an interior space and a main opening.

3. The tree mountable planter assembly of claim 1, further comprising:

said main member being formed by a membranous pouch for permitting atmospheric communication between said interior space and ambient air surrounding said main member.

4. The tree mountable planter assembly of claim 1, further comprising:

said main opening being positioned in an upwardly facing surface of said central portion of said main member.

5. The tree mountable planter assembly of claim 1, further comprising:

each of said distribution ducts having a plurality of dispensing holes positioned in spaced relationship along a length of said distribution duct for permitting fluid passing through said distribution duct to pass into said soil.

6. The tree mountable planter assembly of claim 1, further comprising:

said plurality of distribution ducts including a plurality of outer distribution ducts, each of said outer distribution ducts being positioned to extend outwardly from said central portion of said main member towards a peripheral edge of said main member.

7. The tree mountable planter assembly of claim 1, further comprising:

said plurality of distribution ducts including a central duct extending downwardly from said funnel portion of said watering assembly.

8. The tree mountable planter assembly of claim 1, further comprising:

said main member having a plurality of cutout panels positioned in spaced relationship to each other, each of said cutout panels being positioned on said upwardly facing surface of said main member, each of said cutout panels being selectively removable from said main member for forming an associated cutout hole, each said cutout hole being adapted for permitting a stalk of a plant to pass through said cutout hole while roots of the plant are embedded in said soil for permitting the plant to grow in said soil.

9. The tree mountable planter assembly of claim 1, further comprising:

said main member being elongate and flexible; said elongate flexible main member adapted for being supported by a tree at a junction between a plurality of divergent branches of the tree, said main member having opposite ends drapable over the junction such that a central portion of said main member is supported by the junction of the tree, said main member having an interior space and a main opening;

said main member being formed by a membranous pouch for permitting atmospheric communication between said interior space and ambient air surrounding said main member.

10. The tree mountable planter assembly of claim 1, further comprising:

said main member being elongate and flexible; said elongate flexible main member adapted for being supported by a tree at a junction between a plurality of divergent branches of the tree, said main member having opposite ends drapable over the junction such that a central portion of said main member is supported by the junction of the tree, said main member having an interior space and a main opening;

said main member being formed by a membranous pouch for permitting atmospheric communication between said interior space and ambient air surrounding said main member;

said main opening being positioned in an upwardly facing surface of said central portion of said main member.

11. The tree mountable planter assembly of claim 1, further comprising:

each of said distribution ducts having a plurality of dispensing holes positioned in spaced relationship along a length of said distribution duct for permitting fluid passing through said distribution duct to pass into said soil;

said plurality of distribution ducts including a plurality of outer distribution ducts, each of said outer distribution ducts being positioned to extend outwardly from said central portion of said main member towards a peripheral edge of said main member;

said plurality of distribution ducts including a central duct extending downwardly from said funnel portion of said watering assembly.

12. A tree mountable planter assembly comprising:

an elongate flexible main member adapted for being supported by a tree at a junction between a plurality of divergent branches of the tree, said main member having opposite ends drapable over the junction such that a central portion of said main member is supported by the junction of the tree, said main member having an interior space and a main opening;

said main member being formed by a membranous pouch for permitting atmospheric communication between said interior space and ambient air surrounding said main member;

said main opening being positioned in an upwardly facing surface of said central portion of said main member;

an amount of soil, said soil being held in said interior space of said main member;

a watering assembly coupled to said main opening, said watering assembly including a funnel portion for receiving water for adding moisture to said soil in said interior space;

said watering assembly including a plurality of flexible distribution ducts, each of said distribution ducts having an open first end and a closed second end, said open first end being in environmental communication with said funnel portion whereby a fluid passing through said funnel portion passes into said distribution ducts;

each of said distribution ducts having a plurality of dispensing holes positioned in spaced relationship along a length of said distribution duct for permitting fluid passing through said distribution duct to pass into said soil;

said plurality of distribution ducts including a plurality of outer distribution ducts, each of said outer distribution ducts being positioned to extend outwardly from said central portion of said main member towards a peripheral edge of said main member;

said plurality of distribution ducts including a central duct extending downwardly from said funnel portion of said watering assembly; and said main member having a plurality of cutout panels positioned in spaced relationship to each other, each of said cutout panels being positioned on said upwardly facing surface of said main member, each of said cutout panels being selectively removable from said main member for forming an associated cutout hole, each said cutout hole being adapted for permitting a stalk of a plant to pass through said cutout hole while roots of the plant are embedded in said soil for permitting the plant to grow in said soil.

* * * * *